United States Patent [19]

Krein

[11] Patent Number: 5,548,780
[45] Date of Patent: Aug. 20, 1996

[54] METHOD FOR SEMAPHORE COMMUNICATION BETWEEN INCOMPATIBLE BUS LOCKING ARCHITECTURES

[75] Inventor: William T. Krein, San Jose, Calif.

[73] Assignee: Apple Computer, Inc., Cupertino, Calif.

[21] Appl. No.: 278,264

[22] Filed: Jul. 21, 1994

[51] Int. Cl.$^6$ ............................. G06F 13/00; G06F 13/38
[52] U.S. Cl. ...................... 395/825; 395/726; 395/288; 364/240.2; 364/260; 364/260.1; 364/228; 364/228.3; 364/DIG. 1
[58] Field of Search ................................. 395/825, 823, 395/308, 288, 726, 200.08, 200.12

[56] References Cited

U.S. PATENT DOCUMENTS

| | | | |
|---|---|---|---|
| 4,878,166 | 10/1981 | Johnson et al. ........................... | 395/307 |
| 5,175,829 | 12/1992 | Stumpf et al. ........................... | 395/375 |
| 5,218,678 | 6/1993 | Kelleher et al. ......................... | 395/825 |
| 5,276,806 | 1/1994 | Sandberg et al. ................... | 395/200.08 |
| 5,430,860 | 7/1995 | Capps, Jr. et al. ....................... | 395/482 |
| 5,434,975 | 7/1995 | Allen ....................................... | 395/650 |
| 5,440,698 | 8/1995 | Sindhu et al. ...................... | 395/200.08 |
| 5,454,082 | 9/1995 | Walrath et al. .......................... | 395/288 |
| 5,463,741 | 10/1995 | Levenstein ............................... | 395/299 |

Primary Examiner—Gopal C. Ray
Attorney, Agent, or Firm—Leo V. Novakoski

[57] ABSTRACT

A semaphore method establishes exclusive access transactions between source and destination nodes in a multiple bus computer system, independent of the bus locking architectures of the component buses. An atomic transaction is selected for each bus protocol to mediate exclusive access transactions involving the corresponding bus, and bridges coupling different pairs of buses monitor these buses for the selected atomic transactions. A source node on one bus (the source bus) initiates an exclusive access transaction to a destination node by launching the selected atomic transaction appropriate for the source bus to the destination node. When the path between the source and the destination nodes requires transit of more than one bus, each bridge that couples a pair of buses in the path detects an incoming atomic transaction on one of these buses and launches an outgoing atomic transactions appropriate for the other bus to the destination node. In this way, the atomic transaction initiated by the source node to establish an exclusive transaction with the destination node is coupled through the buses of the system by a series of selected atomic transactions. Since each bus supports at least one atomic transaction, the semaphore method operates effectively, independent of the bus locking architectures of the buses.

15 Claims, 5 Drawing Sheets

METHOD FOR SEMAPHORE COMMUNICATION BETWEEN INCOMPATIBLE BUS LOCKING ARCHITECTURES

BACKGROUND OF THE INVENTION

1. Field of the Invention

The present invention relates to computer systems that employ multiple buses for communicating between different nodes in the computer system, and in particular, to methods for establishing semaphores between nodes on buses which employ incompatible bus locking architectures.

2. Description of Background Art

Computer systems typically comprise processors, memory devices, and input/output (I/O) devices, all of which communicate by means of one or more buses. Devices request control of the buses to transfer data to or receive data from other devices, with competing bus requests handled by a bus arbitration scheme. A device is a bus master when it is granted control of the bus to implement transfers to another device, which becomes the bus slave. The bus master places the address of the bus slave on the bus, identifies the type of operation to be executed, and provides any necessary data and control signals in accordance with the bus protocol. Each bus protocol supports standard bus operations such as reads and writes to bus slaves. In addition to these operations, most bus protocols support one or more atomic transactions in which a plurality of bus operations are treated as a single, indivisible bus operation.

It is often necessary for a bus master to retain exclusive access to a bus slave for a series of operations. For example, in multi-processor computer systems certain regions in computer memory are shared resources that must be available to all processors. These regions are often critical regions which cannot be accessed by more than one processor at a time without causing serious errors. Accordingly, these computer systems must provide some means of assuring that a processor has exclusive access to the shared resource until it has completed its transactions with that resource.

Generally, the bus protocols of different bus/processor systems support different locking architectures for providing a bus master with exclusive access to a bus slave that is a shared resource. In some bus protocols, the bus master asserts a control line in the bus that locks the bus for the duration of its exclusive access transactions, i.e. it stops arbitration. This approach has the drawback of narrowing the bandwidth of the bus by making it unavailable for transactions between other nodes during the period of exclusive access. Other bus protocols support more efficient locking architectures where only the particular bus slave to which exclusive access is sought is locked from other bus masters. These approaches lock the shared resource rather than the entire bus and can be implemented by hardware means such as a control line, by software means, or by some combination of hardware and software means.

Atomic transactions provide a means for implementing a type of lock referred to as a semaphore. A semaphore is an address that is set to a first value to prevent access to a block of data or a shared resource and reset to a second value to indicate that the data or resource is available. A bus master reading the second value can access the data or resource associated with the semaphore. By using a 'read & set' atomic transaction to read the semaphore, the bus master can read the value of the semaphore and set it to the first value in the same operation, indicating to other bus masters that the resource is unavailable. The bus master then resets the semaphore when it has completed its transactions with the shared resource or data block. Semaphores are implemented by atomic transactions supported in the bus protocol of the particular processor/bus system and are thus designed for systems in which the protocols of the component buses support the same locking architecture. For example, packet-based buses transmit a 'read & set' atomic transaction in a single envelope, while most non-packet-based buses transmit a 'read & set' atomic transaction with the 'read' and 'set' in separate envelopes (dual envelope transaction) and simply lock the bus between the two transactions.

Increasingly, however, computer systems must support communications between bus/processor systems that operate according to different bus protocols. Communication between nodes on different buses is achieved by coupling the buses through bridges which handle the translation of bus operations between different bus protocols. Exclusive access transactions between devices on different buses, however, present a particular problem to such hybrid computer systems since the locking architectures of the buses to which the devices are attached may employ any of a variety of hardware, software, or combined hardware/software locking architectures. Under these circumstances, incompatibilities between the bus locking architectures are dealt with by either disallowing bus locks and, consequently, exclusive access transactions altogether or by employing elaborate software algorithms to address the incompatibilities.

SUMMARY OF THE INVENTION

The present invention is a method for implementing exclusive access transactions between bus masters and bus slaves on different buses, that is independent of the locking architectures employed by the buses. In accordance with the present invention, a semaphore for establishing exclusive access transactions between a bus master or source node on one bus (the source bus) and a bus slave or destination node on another bus (the destination bus) is initiated by a selected atomic transaction of the source bus, which is detected and converted to a selected atomic transaction of the destination bus. The selected atomic transaction of the destination bus reads and sets the contents of the destination node, which operates as a semaphore for exclusive access transactions to a shared resource that is accessed through the destination node. The method is effective for communications between buses that support single envelope atomic transactions and those that support dual envelope atomic transactions.

In accordance with the present invention, for each bus protocol an atomic transaction is selected that includes at least a 'read' operation and an explicit or implicit 'write' or 'set' operation. Operating conventions fix the value written or set by the atomic transaction to a first preselected value and limit use of the selected atomic transactions to mediating exclusive access transactions. The method of the present invention does not interfere with transactions between other source and destination nodes on any of the buses, and so does not reduce the bandwidth of the buses.

An exclusive transaction is initiated when a source node launches the selected atomic transaction (source atomic transaction) to a destination node on the destination bus. A bridge coupling the source and destination buses monitors bus transactions and launches the corresponding selected atomic transaction for the destination bus (destination atomic transaction) to the destination node when the selected source atomic transaction is detected.

The destination atomic transaction reads and sets the contents of the destination node with the first selected value to prevent access by any other source node. A read response elicited by the 'read' operation of the destination atomic transaction is coupled by the bridge back to the source node, which detects the read value. When the read response is the first preselected value, the shared resource corresponding to the destination node is locked by another source node, and a new atomic transaction must be launched to test the destination node for availability. On the other hand, when the read value is the second preselected value, the source node has exclusive access to the destination node and may process additional transactions through the bridge to the destination node. The source node ends these exclusive access transactions by writing the second preselected value through the bridge to the destination node. When the source bus supports dual envelope atomic transactions, the 'write' or 'set' is ignored by the bridge, since the value to be written or set is established by the operating convention.

The present invention is also applicable where the source and destination nodes are coupled through a path that includes one or more intermediate buses. In this case, a selected atomic transaction supported by each intermediate bus in the path is launched as the selected atomic transaction from the preceding bus in this path is detected at the corresponding bridge. The read response provided by the destination node is similarly coupled back to the source node through the intermediate buses.

Bus transactions carried out between the launch of the selected atomic transaction and the writing of the second preselected value to the destination node may be used to provide software generated atomic transactions between the source and destination nodes independent of the bus locking architectures of the source and destination buses. Thus, any atomic transactions eliminated from the bus protocol by the operating convention of the present invention may be reintroduced through system-generated atomic transactions that are enabled by the method of the present invention.

The method of the present invention implements exclusive access transactions between bus masters and shared resources on different buses using atomic transactions that are supported by the protocols of the different buses. By using available atomic transactions, which are supported in some form by substantially all bus protocols, the method avoids the need for elaborate software solutions, yet is independent of the locking architectures employed by the different buses. Further, the method of the present invention provides exclusive access to shared resources without reducing the bandwidth of the buses.

DETAILED DESCRIPTION OF THE INVENTION

Figure 1:
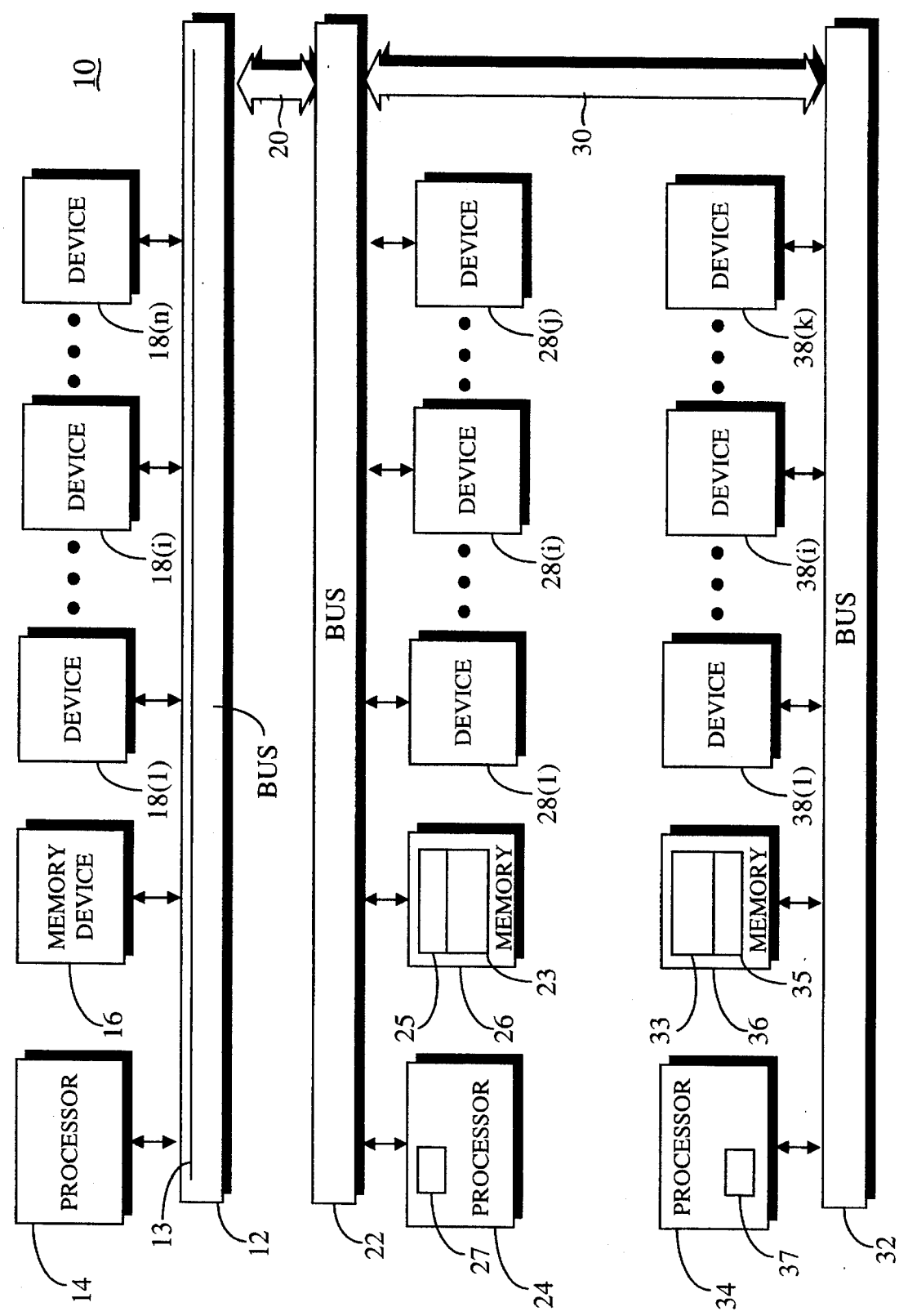
FIG. 1 is a schematic representation of a computer system employing three different buses coupled through a pair of bridges.

Referring to FIG. 1, there is shown one embodiment of a computer system 10 to which the method of the present invention is applicable. Computer system 10 comprises: a first bus 12 to which a processor 14, a memory device 16, and one or more other devices 18(1)-18(n) are coupled; a second bus 22 to which a processor 24, a memory device 26, and one or more other devices 28(1)-28(j) are coupled; a third bus 32 to which a processor 34, a memory device 36, and one or more other devices 38(1)-38(k) are coupled; and first and second bridges 20, 30, respectively. Devices 18(1)-18(n), 28(1)-28(j), 38(1)-28(k) may be, for example, additional processors, memory devices, or input/output (I/O) devices. Bridge 20 couples data between first bus 12 and second bus 22. Likewise, bridge 30 couples data between second bus 22 and third bus 32.

FIG. 1 is a schematic representation of just one possible configuration to which the method of the present invention is applicable. For example, computer system 10 is shown with three buses 12, 22, 32 merely to illustrate different bus locking architectures employed, and is not intended to indicate any limitation on the architecture of multiple bus computer systems to which the method of the present invention is directed.

The problems that arise in a multiple bus system 10 are illustrated by reference to some of the different bus locking architectures which may be employed within each bus/ processor system. For example, first bus 12 may employ a bus protocol in which a separate lock line 13 is asserted by a source node such as processor 14 during exclusive access bus transactions to a destination node such as memory 16. In this case, processor 14 asserts lock line 13 once its bus request has been granted, and maintains lock line 13 asserted for as long as exclusive access is required. Lock line 13 may lock only memory 16 (resource lock) or it may lock first bus 12, depending on the bus protocol of first bus 12. For example, Motorola 68000 and 88000 buses support lock line 13 which locks the entire bus, and atomic transactions on these buses are dual envelope atomic transactions. On the other hand, Nubus supports a lock line 13 to implement resource locking, and the PCI local bus provides a lock line 13 to implement either resource or bus locks.

Similarly, second bus 22 may employ a semaphore between a source node such as processor 24 and a destination node such as memory 26 to implement exclusive access transactions. For example, one bus protocol employs a 'read & reserve' atomic transaction followed by a 'conditional write' for this purpose. Processor 24 initiates an exclusive access transaction to a shared resource 23 in memory 26 that is entered through destination node 25 by launching a 'read & reserve' atomic transaction to destination node 25. Processor 24 includes a reserve flag 27 which is set when the 'read & reserve' is launched. Processor 24 then snoops all bus addresses asserted during its transaction with destination node 25 and resets reserve flag 27 if another bus master accesses destination node 25 during this period. At the conclusion of the transaction with destination node 25, processor 24 issues the 'conditional write' only if reserve flag 27 has not been reset in the interim. Otherwise a status bit is set to indicate that the transaction was not exclusive. This method does not actually enforce exclusive access between processor 24 and shared resource 23, but merely provides a scheme to monitor when an access has not been exclusive.

Similarly, third bus 32 may be a packet-based bus that employs a different semaphore to implement exclusive access transactions. Depending on the (single envelope) atomic transactions supported by its bus protocol, processor 34 may issue a 'read and set', 'test and set', 'degenerate swap' or other similar atomic transaction, to read and set a lock variable that serves as a semaphore. In this case, the selected atomic transaction is launched by processor 34 to a destination node 35 which operates as a semaphore for a shared resource 33 in memory device 36.

Figure 2:
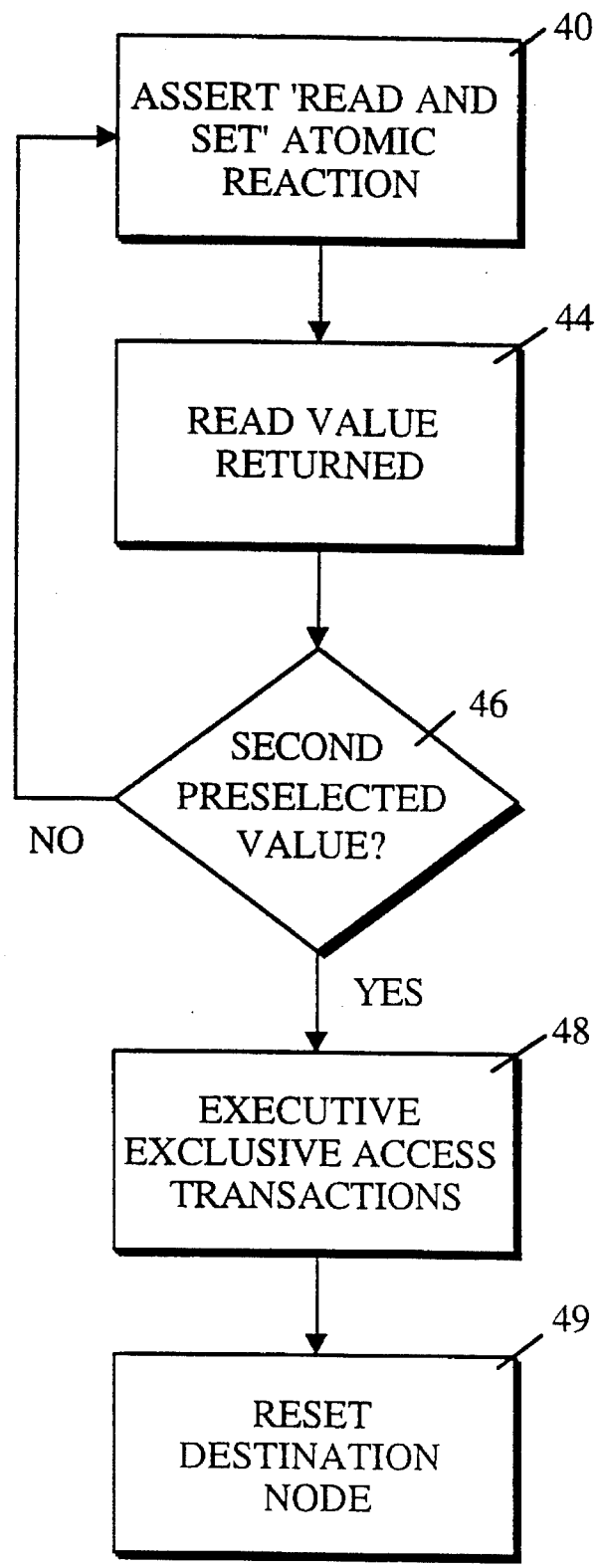
FIG. 2 is a flow chart representing the operation of a lock variable for excluding source nodes from a shared resource.

Referring now to FIG. 2, there is shown a flow chart summarizing the operation of destination node 35 as a semaphore for shared resource 33. At step 40, processor 34 asserts the selected atomic transaction to destination node 35. The atomic transaction elicits a read response 44 of the contents of destination node 35 to processor 34 and simultaneously sets the contents of destination node 35 to a first preselected value. By software convention, a device reading a first preselected value at destination node 35 is unable to access shared resource 33. Thus, the value returned by the read response is detected 46 and if equal to the first preselected value, access to shared resource 33 is denied. If the second preselected value is detected 46, processor 34 owns shared resource 33 since destination node 35 is now set to the first preselected value, preventing access by other bus masters. Processor 34 may then execute 48 its exclusive access transactions with shared resource 33 and, when these are completed, write 49 the second preselected value to destination node 35.

Given the differences between the above described bus locking architectures, it is clear that implementation of bus locking or resource locking operations across different buses 12, 22, 32 is not a straightforward matter. For example, where processor 14 attempts to access shared resource 33 through destination node 35 in memory 36, the bus protocol of third bus 32 has no provision responding to assertion of lock line 13 by processor 14. Further, since third bus 32 supports single envelope atomic transactions, no means is provided for processing the explicit 'write' or 'set' operation of a dual envelope atomic transaction launched on first bus 12 or second bus 22. The problem is compounded since the exclusive access transactions of processor 14 must be coupled across second and third buses 22, 32, neither of which has a bus protocol that supports lock line 13. While software procedures may be developed to compensate for some of these incompatibilities, the complexity of such procedures is bound to increase as the numbers and kinds of processors 14, 24, 34 and buses 12, 22, 32, respectively, used in multiple bus computer systems 10 increase.

The present invention is a system and method for implementing a semaphore to establish exclusive access between a source node and a destination node across two or more buses, independent of the bus locking architecture of the buses. The method uses an atomic transaction, some form of which is supported by substantially all bus protocols, to initiate and execute the exclusive access transaction through the bridges that couple the buses to which the source and destination nodes are connected. The atomic transactions selected for implementing exclusive access transactions are detected and translated as necessary at the bridges through which different buses are coupled.

Figure 3A:
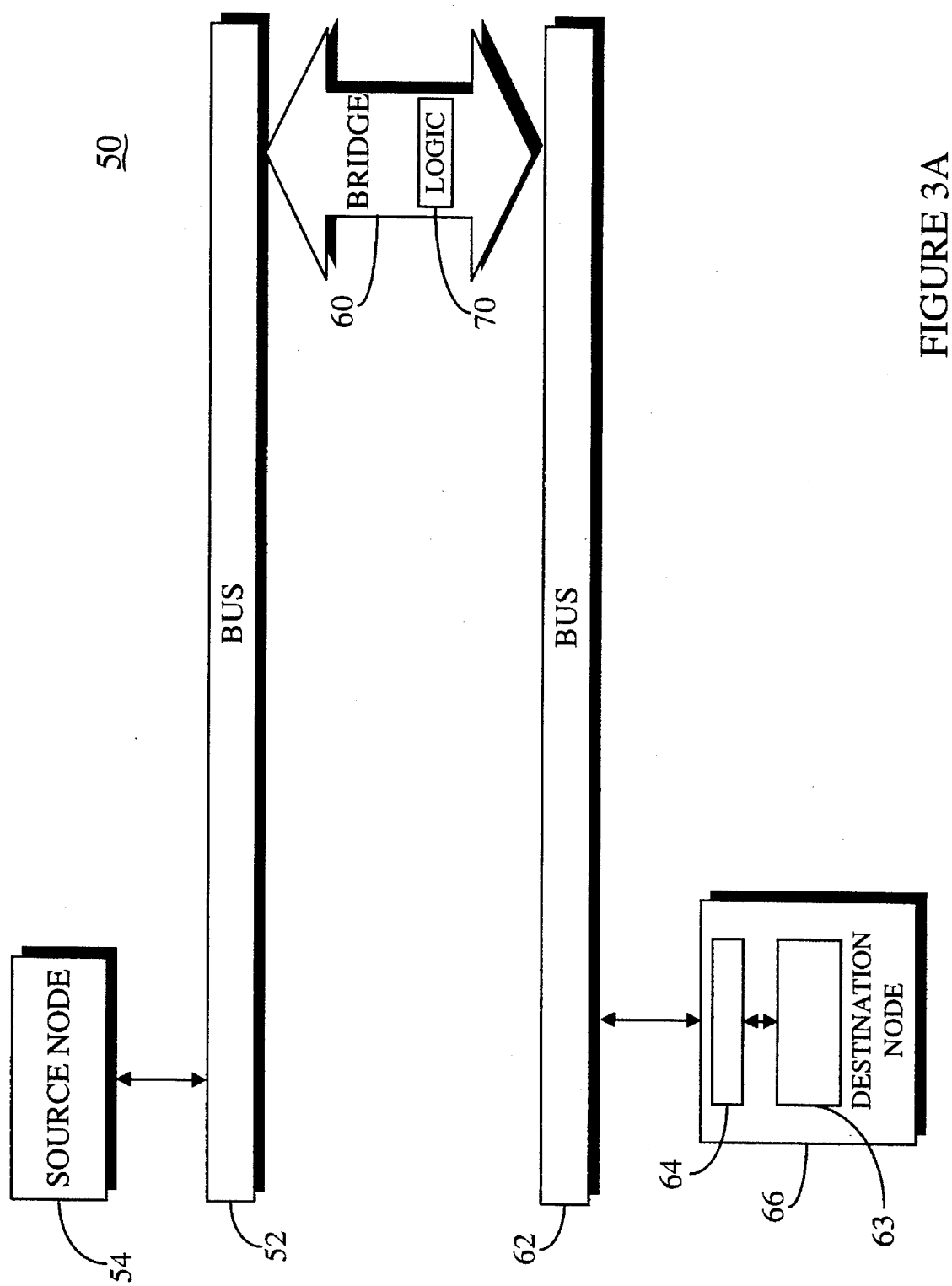
FIG. 3A is a schematic diagram of a subset of a multiple bus computer system to which the method of the present invention applies.

Referring now to FIG. 3A, there is shown a simplified schematic representation of part of a multiple bus computer system 50 that includes: a source node 54 coupled to a source bus 52; a destination node 64 coupled to a destination bus 62; and bridge 60 through which source and destination buses 52, 62 are coupled. For example, source node 54 may be a processor or an I/O device and destination node 64 may be an address in a memory device 66 through which access is gained to a shared resource 63. It is noted that the source and destination designations change according to which device is initiating the bus transaction. For example, if device 63 initiated a read to device 54, device 63 and bus 62 would be the source node and bus, respectively, and device 54 and bus 52 would be the destination node and bus.

Bridge 60 includes logic circuitry 70 for electrically coupling source and destination buses 52, 62, and has access to programs for identifying and translating bus operations between source and destination buses 52, 62. For example, the semaphore method of the present invention may be conveniently implemented by logic circuitry 70 of bridge 60 or by micro-code in a micro-processor.

Figure 4:
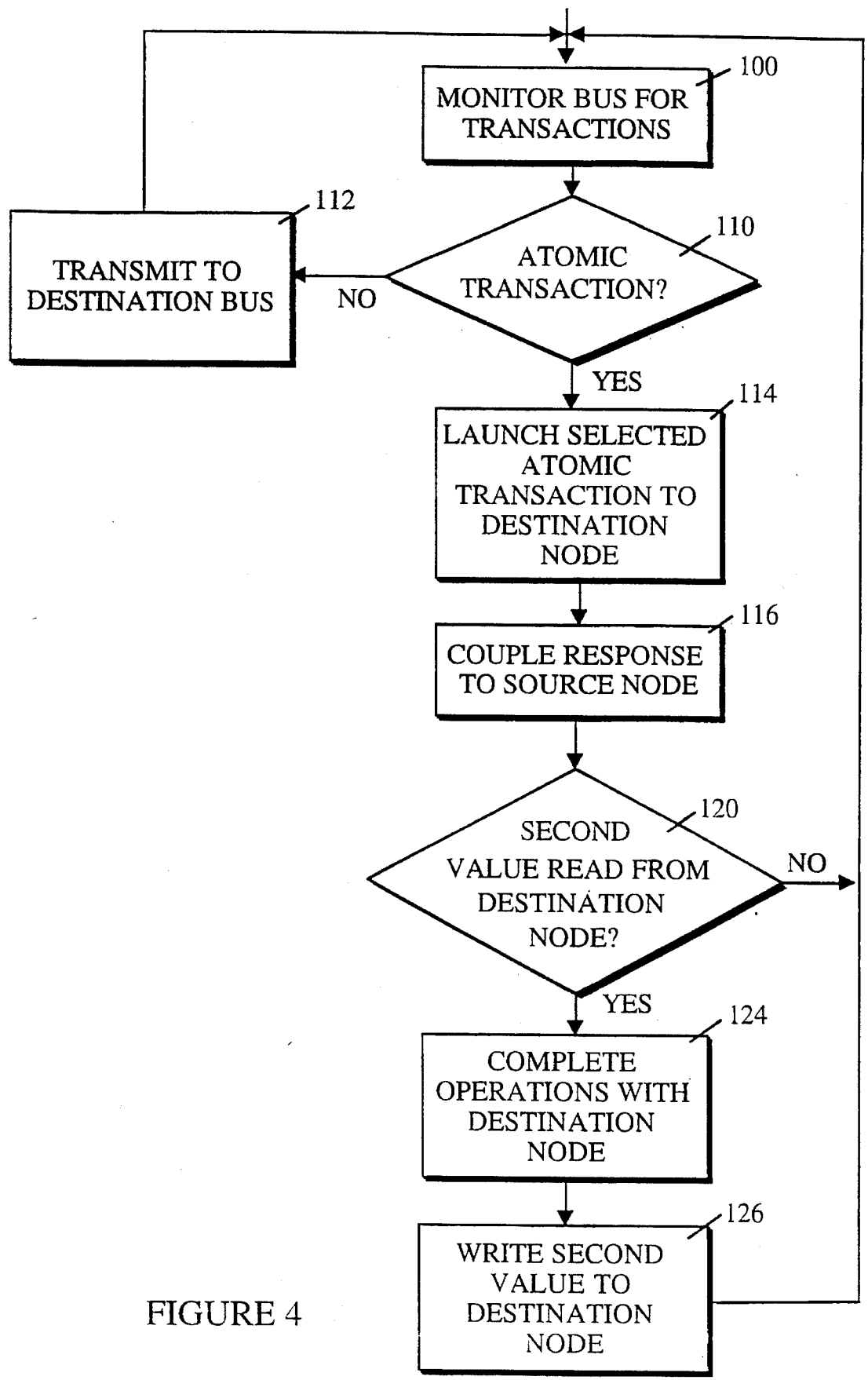
FIG. 4 is a flow chart representing the semaphore method of the present invention.

Referring now to FIG. 4, there is shown a flow chart representing the method of the present invention. In accordance with this method, bus crossing transactions on source and destination buses 52, 62, respectively, are monitored 100 to detect the various bus operations being asserted. When a bus crossing transaction is initiated by source node 54, it is determined 110 whether the transaction is an atomic transaction or a single transfer transaction such as a read or write transaction. Different bus protocols express this information in different ways. For example, some bus protocols require that source node 54 assert certain control lines to indicate whether the transaction is a read, write, or some other type of transaction. In other bus protocols such as packet based bus protocols, the transaction type is transmitted as part of a header along with the address of the destination. In either case, the nature of a bus crossing transaction is readily determined 110.

When a non-atomic transaction is detected 110, it is coupled 112 to destination bus 62 with appropriate translation between the bus protocols of source and destination buses 52, 62, respectively. On the other hand, when an atomic transaction is detected 110, the method of the present invention treats it as an initiation of an exclusive access transaction by the source node 54. For this purpose, an operating convention is adopted that only one of the atomic transactions supported by each bus protocol is employed. With this operating convention, detection of an atomic transaction unambiguously indicates that an exclusive access transaction is being initiated. As discussed below, this operating convention does not limit operation of the various buses, since the exclusive access transactions created using the method of the present invention can be used to generate any atomic transaction desired. Further, these system-generated atomic transactions, like all exclusive access transactions implemented with the present invention, will be operable between buses employing different bus locking architectures.

Substantially all buses support an atomic transaction that includes a 'read' request and a 'write' or 'set' operation to the same destination which are executed as a single, indivisible bus operation. For example, 'swap' transactions, 'memory exchange (XMEM) transactions', 'test & set' transactions, and 'read-modify-write' transactions can all be parameterized to read a destination node 64 and immediately write a preselected value to destination node 64. Thus, an atomic transaction corresponding to 'read & set' transaction or the nearest equivalent supported by the bus protocol of destination bus 62 is selected for the method of the present invention. The selected atomic transaction of destination bus 62 is launched 114 in response to detection by bridge 60 of the selected atomic transaction from source node 54. The selected atomic transaction selected to initiate exclusive access transactions by source node 54 is also parameterizable to a 'read & set' type atomic transaction. Where the 'read & set' or 'read & write' of source bus 52 is a dual envelope atomic transaction, there is no need to wait for the 'set' or 'write' operation, since its value is established by the operating convention of the present invention. The exclusive access transaction is initiated by detection of the 'read' operation of the dual envelope atomic transaction on source bus 52, and when the 'write' or 'set' operation arrives, it is ignored.

In the method of the present invention, the value written to the destination node 64 is a first preselected value which, by software convention, is recognized by other nodes as indicating that destination node 64 is not accessible. For example, in one embodiment of the invention, the 'set' step of the 'read & set' or its equivalent atomic transaction writes all ones to destination node 64.

The 'read' request of the selected destination atomic transaction elicits a 'read' response from the destination node 64 which is coupled 116 back to source node 54 through bridge 60. When the value of the read response detected 120 by source node 54 is a second preselected value, source node 54 owns destination node 64 and, consequently, also owns shared resource 66 which is accessed through destination node 64. Operations for which source node 54 sought exclusive access to destination node 64 are then processed 124 without interruption at shared resource 66 by any other source node. The exclusive access transactions continue until source node 54 writes 126 the second preselected value back to destination node 64, allowing other source nodes 74 to access and own destination node 64.

If on the other hand, the 'read' response coupled 116 back to source node 54 is the first preselected value, the shared resource is not available. The selected destination atomic transaction has not altered the status of destination node 64 since the first preselected value was both read and written by the selected destination atomic transaction. In this case, source node 54 is denied access to destination node 64, and source node 54 must submit a new bus request to arbitration to establish an exclusive access transaction.

The method of the present invention thus allows source node 54 to gain exclusive access to destination node 64 by means of selected atomic transactions, each of which is supported by the protocol of the bus 52, 62 on which it is launched. This eliminates the need to invoke the hardware or software that is specific to the bus locking architectures of either the source or destination buses 52, 62.

One embodiment of the semaphore method of the present invention implements exclusive transactions between a packet-based PSI+ bus from Apple Computers and a Motorola 88000 bus. The PSI+ bus has no bus lock line 13 for implementing exclusive transactions, relying instead on a single envelope 'read & set' atomic transaction for this purpose. On the other hand, the Motorola 88000 bus employs a bus lock line 13 for exclusive transactions. The Motorola bus also supports a dual envelope memory exchange (XMEM) atomic transaction, which issues a read of a memory location, simultaneously locks the bus by asserting the lock line, and, when the read response is received by the source node, writes a value supplied by the source node to the memory location. Under the operating convention of the present invention, XMEM is reserved for initiating exclusive access transactions, and the write operation of the XMEM atomic transaction is parameterized to write the first preselected value to the destination node. Similarly, the 'read & set' atomic transaction of the PSI+ bus is reserved for exclusive access transactions involving the PSI+ bus. The method is described below for the case in which the Motorola 88000 bus serves as source bus 52 and the PSI+ bus serves as destination, bus 62 with the understanding that either bus may serve as source bus, 52 or destination bus 62.

According to the operating convention of the present invention, a source node 54 on Motorola source bus 52 initiates an exclusive access transaction by launching an XMEM atomic transaction. Bridge 60 monitors Motorola source and PSI+ destination buses 52, 62, respectively, and when the 'read' operation of the XMEM atomic transaction is detected on Motorola source bus 52, launches a 'read & set' to destination node 64 on PSI+ destination bus 62. The contents of destination node 64 are placed on destination bus 62 as a read response to the read request of the PSI+ bus 'read & set' atomic transaction, and the 'set' operation immediately writes the first selected value (typically all bits set to ones) to destination node 64. Bridge 60 detects the read response on destination bus 62 and couples it to source bus 52 where it is read by source node 54. When the read response contains the second selected value, exclusive access to destination node 64 is established and source node 54 can proceed with additional transactions. On the other hand, when the read response contains the first selected value, source node 64 is unavailable.

The 'write' operation of the XMEM is launched when source node 54 receives the read response. Since the value written is established by the operating convention and the 'set' of the PSI+ bus single envelope atomic transaction has already set destination node 64 to this value, the 'write' of the XMEM atomic transaction is ignored when detected at bridge 60. Thus, the semaphore method of the present invention uses the selected atomic transaction on source bus 52 as a signal to bridge 60 to execute the selected atomic transaction on destination bus 64. More generally, where additional buses are in the path between source node 54 and destination node 64, the selected atomic transactions on all buses but destination bus 62 serve this signaling function, with only the selected atomic transaction on destination bus 62 being fully executed.

In another embodiment of the present invention, exclusive transactions between devices on the 601 bus of the Apple Computer and the industry standard PCI bus may be implemented using the 'read & reserve' atomic transaction of the 601 bus and the 'read & set' atomic transaction of the PCI bus as the selected transactions.

Referring again to the PSI+/88000 bus system example, it is clear that since the XMEM atomic transaction supported by the Motorola bus protocol is reserved for exclusive access transactions, it can no longer be used to simply exchange the contents of a memory location with the contents of a register of the source node. The same is true of the atomic transaction selected to implement exclusive transaction on each bus of a multi-bus system. However, any transactions that occur during the period of exclusive access between source node 54 and destination node 64 are atomic transactions with respect to source and destination nodes 54, 64. This provides a method for creating system generated atomic transactions between any source and destination nodes.

An atomic XMEM operation between source and destination nodes 54, 64 may be generated by including appropriate bus transfers between the selected atomic transaction on source bus 52 that initiates the exclusive transaction and the write operation that resets destination node 64 to the second selected value. For example, source node 54 initiates an exclusive access transaction with destination node 64 by launching an appropriately parameterized XMEM atomic transaction. Once ownership of destination node 64 is established, source node 54 launches a read followed by a write to destination node 64 to effect the memory exchange as an exclusive access transaction. This is followed by a write of the second preselected value to destination node 64, releasing it for access by other source nodes. More elaborate atomic transactions can be generated by the method of the present invention by including different bus operations between the time that source node establishes ownership of the destination node and the time the source node relinquishes ownership by writing the second preselected value to the destination node.

Figure 3B:
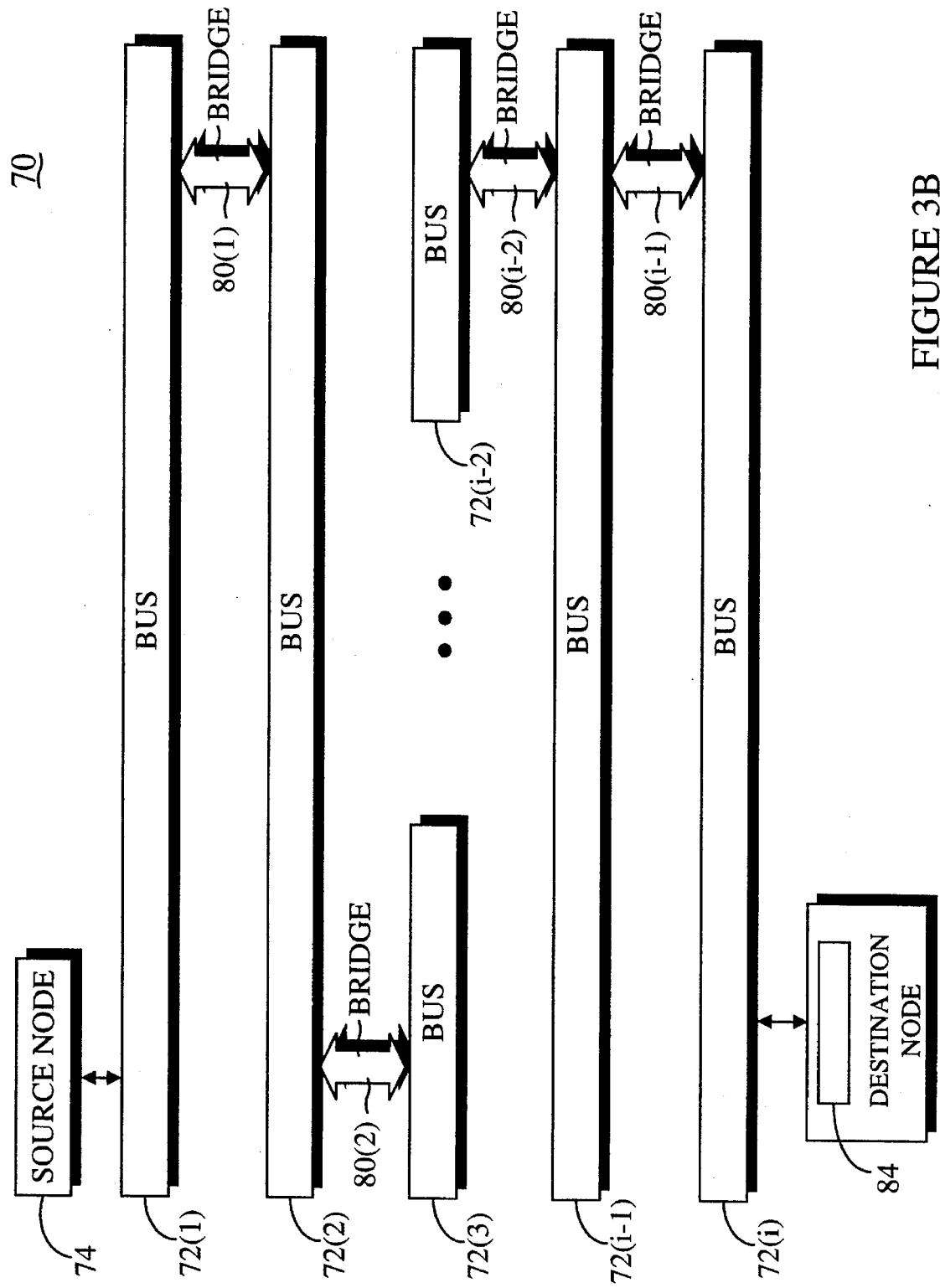
FIG. 3B is a schematic diagram of a multiple bus computer system to which the method of the present invention applies, where the path between the source and destination nodes includes intermediate buses.

Referring now to FIG. 3B, there is shown a schematic representation of a multiple bus computer system 90 in which the path between a source node 74 connected to a source bus 72(1) and a destination node 84 connected to a destination bus 72(i) includes intermediate buses 72(2)-72(i-1) coupled by bridges 80(1)-80(i-1). The method of the present invention is equally applicable to computer system 90 by selecting an atomic transaction for each bus 72(1), 72(2), . . . 72(i) to mediate exclusive access transactions that require access to the bus, whether as a source bus 72(1), a destination bus 72(i), or an intermediate bus 72(2)-72(i-1).

Referring again to FIG. 4, an exclusive access transaction is initiated when a selected atomic transaction is launched by source node 74 to destination node 84. Each bridge 80(1), 80(2), 80(i-1) in the path between source node 74 and destination node 84 monitors 100 a pair of buses 72(1), 72(2); 72(2), 72(3); . . . 72(i-1), 72(i), respectively, which it couples for a first selected atomic transaction and launches 114 a second selected atomic transaction to destination node 84 when the first selected atomic transaction is detected 110. Thus, the coupling between source node 74 and destination node 84 occurs through a series of atomic transactions each of which is launched 114 in turn when a selected atomic transaction from the bus which precedes it in the path between source and destination nodes 74, 84, respectively, is detected 100.

As in the two-bus example of FIG. 3A, only the selected atomic transaction at destination node 84 actually executes its 'write' or 'set' operation. The 'write' or 'set' operation of the first atomic transaction and any intermediate atomic transactions are ignored.

The read response elicited from destination node 84 by the selected atomic transaction of destination bus 72(i) is coupled from destination node 84 to source node 74 by traversing intervening buses 72(1)-72(i) in reverse order. Similarly, system generated atomic transactions may be implemented in multiple bus computer system 90 where each bus operation of the exclusive access transaction is coupled between source and destination nodes 74, 84 through a path comprising buses 72(1)-72(i) between source and destination nodes 74, 84.

Thus, a semaphore method of the present invention establishes exclusive access transactions between source and destination nodes located on source and destination buses, respectively, independent of the bus locking architectures of the source and destination node buses. The semaphore method of the present invention invokes atomic transactions supported by the bus protocols of each bus to implement the semaphore, without recourse to the bus locking architecture of either bus.

I claim:

1. A computer implemented method for granting a source node on a first bus exclusive access to a destination node on a second bus that is coupled to the first bus, the method comprising the steps of:

monitoring the first bus to detect a first selected atomic transaction launched by the source node to the destination node;

launching a second selected atomic transaction to the destination node on the second bus in response to detecting the first selected atomic transaction;

coupling to the source node a value read from the destination node in response to receipt of the second selected atomic transaction at the destination node;

writing a first preselected value to the destination node in response to receipt of the second selected atomic transaction at the destination node, the first preselected value being effective to prevent another source node from gaining access to the destination node; and granting ownership of the destination node to the source node if the value coupled to the source node from the destination node is a second preselected value.

2. The method of claim 1 comprising the additional step of launching a plurality of transactions between the source node and the destination node once the source node has been granted exclusive access to the destination node.

3. The method of claim 2 comprising the additional step of writing the second preselected value to the destination node when the source and destination node have completed the plurality of transactions.

4. The method of claim 1, wherein the first selected atomic transaction comprises a read request and a write operation.

5. The method of claim 1, wherein the first selected atomic transaction comprises a read request and a set operation.

6. The method of claim 1, wherein the first selected atomic transaction is selected from the group of atomic transactions comprising memory exchange transactions, swap transactions, read and set transactions, read and test transactions, read-write-modify transactions, and read and reserve transactions.

7. The method of claim 1 wherein the second selected atomic transaction comprises a read request and a write operation.

8. The method of claim 1, wherein the second selected atomic transaction comprises a read request and a set operation.

9. The method of claim 1, wherein the second selected atomic transaction is selected from the group of atomic transactions comprising memory exchange transactions, swap transactions, read and set transactions, read and test transactions, read-modify-write transactions; and read and reserve transactions.

10. The method of claim 1, wherein the destination node is a lock variable associated with a shared resource.

11. The method of claim 5, wherein the second preselected value is all zeroes.

12. The method of claim 6, wherein the first preselected value is all ones.

13. The method of claim 1, wherein the step of launching the second selected atomic transaction to the destination node on the second bus in response to detection of the first selected atomic transaction comprises launching in sequence to the destination node a selected atomic transaction on each of a series of intermediate buses that are serially connected to form a path between the first and second buses, in response to the first selected atomic transaction reaching the first intermediate bus of the series.

14. A computer implemented method for implementing plurality of bus transactions as an atomic transaction between a source node on a first bus and a destination node on a second bus that is coupled to the first, the method comprising the stops of:

monitoring the first bus to detect a first selected atomic transaction launched by the source node to the destination node;

launching a second selected atomic transaction to the destination node on the second bus in response to detection of the first selected atomic transaction;

coupling to the source node a value read from the destination node in response to receipt of the second selected atomic transaction at the destination node;

writing a first preselected value to the destination node in response to receipt of the second selected atomic transaction at the destination node, the first preselected value being effective to prevent another source node from gaining access to the destination node;

granting ownership of the destination node to the source node if the value coupled to the source node from the destination node is a second preselected value;

implementing the plurality of bus operations between the source and destination nodes; and writing the second preselected value to the destination node in response to of the plurality of bus operations being completed.

15. The method of claim 14, wherein the step of launching the second selected atomic transaction to the destination node on the second bus in response to detection of the first selected atomic transaction comprises launching in sequence to the destination node a selected atomic transaction on each of a series of intermediate buses that are serially connected to form a path between the first and second buses, in response to the first selected atomic transaction reaching the first intermediate bus of the series.

* * * * *